Patented Apr. 18, 1939

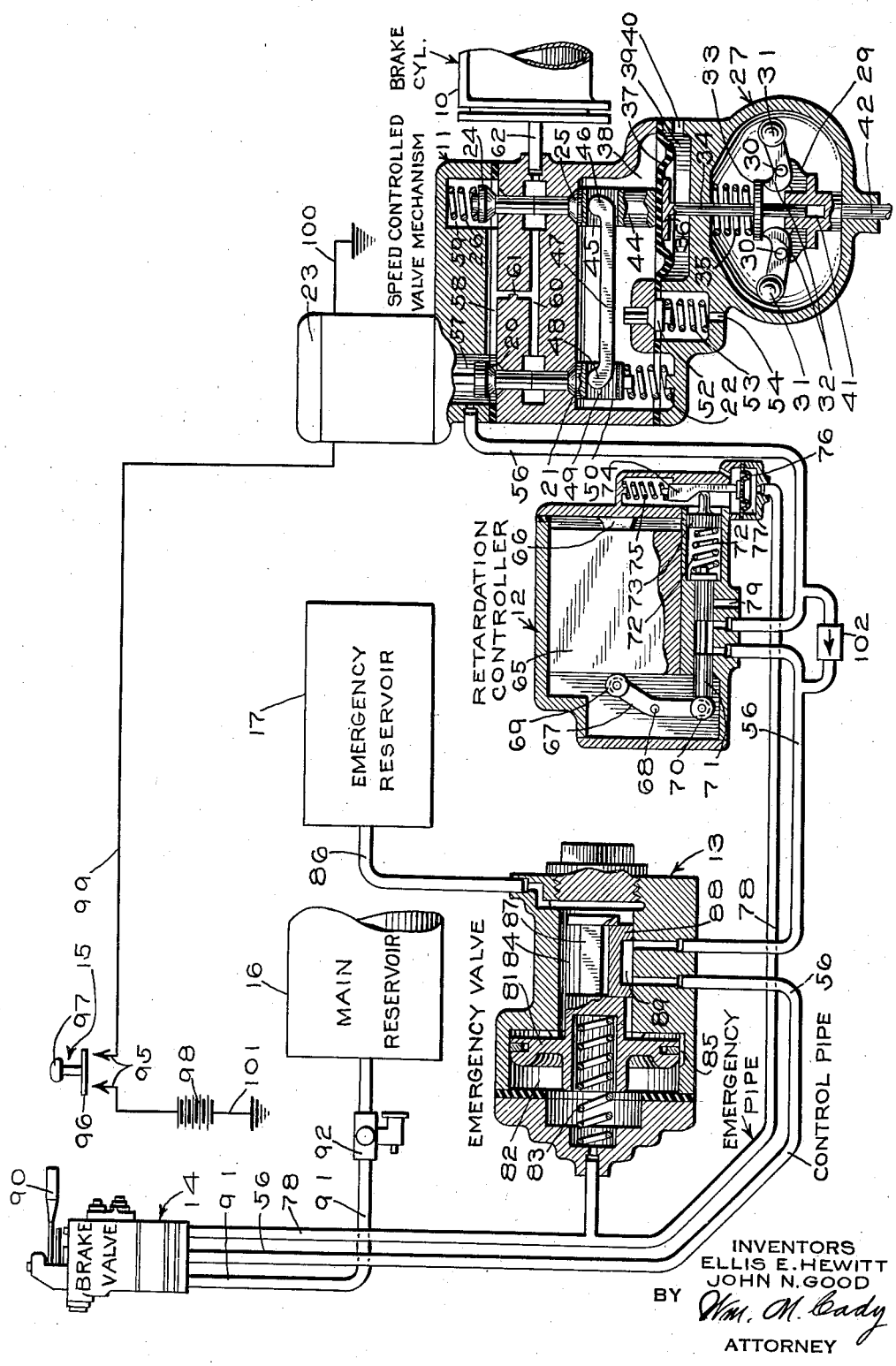

2,155,228

UNITED STATES PATENT OFFICE 2,155,228

RETARDATION CONTROLLED BRAKE

Ellis E. Hewitt, Edgewood, and John N. Good, Wilmerding, Pa., assignors to The Westinghouse Air Brake Company, Wilmerding, Pa., a corporation of Pennsylvania Application June 30, 1937, Serial No. 151,192

9 Claims. (Cl. 303—21)

This invention relates to retardation controlled brakes and more particularly to brake systems for railway and traction vehicles in which the degree of braking is controlled with relation to the rate of retardation of the vehicle.

It is well understood in the railway brake art that when the brakes are applied to a relatively high degree, while a railway vehicle is traveling at a high speed, the degree of the application must be diminished as the vehicle speed diminishes, or otherwise sliding of the vehicle wheels may result. This is due to the fact that the coefficient of friction between the brake shoes and the vehicle wheel treads increases as the vehicle speed diminishes, and, as a consequence, the effective braking effort increases although the brake cylinder pressure may remain constant.

In order to minimize the danger of wheel sliding, which for well known reasons is highly objectionable, it has heretofore been proposed to provide a retardation controller device for controlling brake cylinder pressure as the speed of the vehicle diminishes. The retardation controller device functions to maintain a substantially constant rate of retardation during the deceleration period. It is usually provided with an adjusting mechanism which during service applications of the brakes adjusts the device to maintain one substantially constant rate of retardation, and which during emergency applications adjusts the device to maintain a higher rate of retardation.

If the higher rate of retardation is maintained until the vehicle comes to rest, there may be sufficient shock at the instant the vehicle stops as to cause great discomfort to the passengers, or damage to the vehicle or its lading. In order to avoid this, it is desirable that some means be provided for tapering off the rate of retardation at the end of the deceleration period.

It is accordingly a principal object of this invention to provide means, in connection with a retardation controlled brake, whereby the rate of retardation may be tapered off at the end of the deceleration period, the means for so doing being selective at the will of the operator.

It is a further object of the invention to provide means of the foregoing character which is controlled according to the speed of the vehicle, so that when it is effective it will operate to diminish the degree of braking in accordance with the decrease in vehicle speed.

Further objects and advantages of the invention, dealing particularly with novel constructions and arrangements of parts, will be more fully understood from the following description of an embodiment of the invention, which is illustrated in the single figure of the attached drawing. This figure shows in simplified form an adaptation of the invention to a single railway vehicle.

Referring now to the drawing, the parts there illustrated comprise a brake cylinder 10, a speed controlled valve mechanism 11, a retardation controller device 12, an emergency valve device 13, a brake valve device 14, a manually operated switch device 15, a main reservoir 16, and an emergency reservoir 17.

Considering now these devices more in detail, the brake cylinder 10 is intended to operate the usual friction brake customarily employed on railway and traction vehicles, and while only one brake cylinder has been illustrated it will be apparent that any number may be employed.

The speed controlled valve mechanism 11 is embodied in a casing provided with two sets of valves. The first set of valves includes valves 20 and 21, which have fluted stems in abutting relationship. A spring 22 acts to urge the valve 21 toward seated position and the valve 20 toward unseated position. An electromagnet 23 operates when energized to actuate the valve 20 to seated position and the valve 21 to unseated position.

The other set of valves includes a valve 24 and a valve 25, also having fluted stems arranged in abutting relationship, as is clearly apparent from the drawing. A spring 26 acts to urge the valve 24 toward seated position and the valve 25 toward unseated position.

A centrifuge device, generally indicated in diagrammatic form only at 27, controls the shifting of the valves 24 and 25 between seated and unseated positions. This centrifuge device comprises a rotatable member 29 having pivotally mounted thereon at 30 two movable weights 31. As is evident from the drawing, when the member 29 is rotating, the weights 31 will be thrown outwardly due to centrifugal force. As the weights move outwardly the ends 32 of the arms to which they are attached engages and shifts upwardly a collar 33 secured to a stem 34. This upward movement of the collar and stem is resisted by a spring 35, which constantly tends to move the collar and stem to a lower position. The upper end of the stem 34 terminates in a flange 36 which engages a flexible diaphragm 37. This diaphragm is subject on its uppermost side to the pressure of fluid in a chamber 38 and on its lowermost side to atmospheric pressure in a chamber 39, which is always open to the atmosphere by way of the port 40.

The lower end of the stem 34 is slidable in a recess 41 in the rotatable member 29, and consequently does not rotate therewith and may be secured against rotation. The rotatable member 29 is secured to a stem or shaft 42, which is driven at a speed equal to or proportional to vehicle speed. The connection between this shaft 42 and some rotatable part of the vehicle, as for example a vehicle axle or wheel, may be accomplished by any of the usual means.

Secured to or formed integrally with the aforementioned valve 25 is a member 44 in abutting engagement with the upper side of the diaphragm 37. This member is apertured or slotted at 45 so as to receive a rounded end 46 of a valve actuating bar or member 47. The end 46 may be loosely secured in the slot 45 in any suitable manner.

The other end of the valve actuating member 47 has a similar rounded end 48, which is disposed in a recess or slot 49 in a member 50 attached to or integrally formed with the valve 21.

Immediately under the valve actuating member 47, intermediate its two ends 46 and 48, is a release valve 52. As may be seen from the drawing, this valve is urged towards its seated position by a spring 53, but when unseated by engagement therewith of the valve actuating member 47, opens communication between the chamber 38 and the atmosphere, by way of an exhaust port 54.

Considering now the communications controlled by the aforementioned valves 20, 21, 24 and 25, it will be observed that a sectionalized pipe 56, hereinafter referred to as a control pipe, enters the casing of the speed controlled valve mechanism 11 adjacent the valve 20 and is in continuous open communication with chamber 57 in which the valve 20 is disposed, and also with a passage 58. The passage 58 extends to and is always in open communication with a chamber 59 in which the valve 24 is disposed. The passage 58 is also in constant and open communication with a brake cylinder passage 60, by way of a port or passage containing a choke or restriction 61. The brake cylinder passage 60 connects with the brake cylinder 10 by way of pipe 62.

When both valves 20 and 24 are unseated, one unrestricted communication is established between the control pipe 56 and the brake cylinder passage 60 past the unseated valve 20, and similarly another unrestricted communication is established between the control pipe and brake cylinder past the unseated valve 24. When both valves 20 and 24 are seated, the control pipe is in restricted communication only with the brake cylinder, by way of the choke or restriction 61.

When the valve 20 is seated and the valve 21 is unseated, the brake cylinder 10 is in communication with the chamber 38 by way of pipe 62, brake cylinder passage 60, and past the unseated valve 21. Similarly, when the valve 24 is seated and the valve 25 is unseated, the brake cylinder is also in communication with the chamber 38 by another communication leading past the unseated valve 25. The purpose of this arrangement of valves and communications will be more fully understood from the description of operation of the invention which will follow subsequently.

Considering now the retardation controller device 12, this device is embodied in a casing having slidably disposed therein a mass or a body 65, which in its illustrated position engages at its right end a stop 66, and at its left end one end of a lever 67. The lever 67 is pivotally mounted to the casing of the device at 68, and carries at its upper end a roller 69 engaging the body 65. At its lower end the lever 67 also carries another roller 70, engaging one end of a slide valve 71, the other end of the slide valve being engaged by a spring 72.

The retardation controller device is positioned on the vehicle such that when the vehicle is decelerating the body 65 is urged to the left. The spring 72 is a calibrated spring, so that the degree of movement of the body is proportional to the rate of deceleration. Tension on the spring 72 may be varied by an adjusting mechanism comprising a movable abutment 73 and a wedge member 74, which at its upper end has pressure applied thereto by a spring 75, and which at its lower end is in abutting relationship with a flexible diaphragm 76. This diaphragm is subject on its lowermost side to pressure of fluid in a chamber 77. The chamber 77 is in open communication with a pipe 78, which pipe is adapted to be normally charged with fluid under pressure, such for example as is characteristic of a brake pipe, emergency pipe, or a safety control pipe. For convenience in reference, this pipe will hereinafter be referred to as an emergency pipe.

When the emergency pipe 78 is charged with fluid at a predetermined pressure, the pressure of the fluid acting on the diaphragm 76 will hold the wedge 74 in the position illustrated. When fluid under pressure is released from the emergency pipe and the pressure therein diminishes sufficiently to produce an emergency application of the brakes, the spring 75 shifts the wedge 74 downwardly and thereby moves the abutment 73 inwardly to increase the tension on the spring 72.

Now when the retardation controller weight 65 is moved to the left, it will, for a given initial tension on the spring 72, shift the slide valve 71 at one rate of retardation to a position where communication between the two connected sections of the control pipe is interrupted, and will at a higher rate of retardation shift the slide valve to a position where the right hand connected section of the control pipe is connected to an exhaust port 79. If the tension on the spring 72 is varied, the rates of retardation required to shift the slide valve to the aforesaid lap and release positions, respectively, will consequently vary.

It will thus be apparent that with the lower initial tension on the spring 72, which is that customarily employed during service applications of the brakes, the lap and release functions of the retardation controller device will be performed at relatively low rates of retardation. With the higher initial tension on the spring 72, as customarily employed during emergency applications of the brakes, higher rates of retardation will be required to perform the lap and release functions.

Considering now the emergency valve device 13, this device is embodied in a casing containing therein an emergency piston 81, subject on its left hand side to the pressure of fluid in a chamber 82 and also to the pressure of a biasing spring 83, and subject on its right hand side to the pressure of fluid in a slide valve chamber 84. In its illustrated position, which is the release position, the piston 81 uncovers a feed groove 85, which provides a charging communication between the chamber 82 and the chamber 84. The chamber 84 has in constant open communication therewith the aforementioned emergency reservoir 17, the connection being formed by way of pipe 86. The chamber 82 is connected to the emergency pipe 78, so that the emergency reservoir 17 may be charged in the release position of the piston 81.

The piston 81 is provided with a stem 87 having collars thereon for embracing a slide valve 88, in a manner such that the slide valve is moved coextensively with movement of the piston 81. In the release position of the piston and slide valve, a cavity 89 in the slide valve connects the two connected sections of the control pipe 56.

Upon a reduction in pressure in the chamber 82 caused by a reduction of pressure in the emergency pipe 78 at an emergency rate, the overbalancing pressure in the chamber 84 shifts the piston 81 to its extreme left hand position, in which position the feed groove 85 is closed and the slide valve 88 disconnects the two connected sections of the control pipe 56, and opens communication between chamber 84 and the right hand section of the control pipe 56, so that fluid under pressure may flow from the emergency reservoir 17 to this section until equalization takes place.

Upon a restoration of pressure in the emergency pipe 78 and chamber 82, the piston 81 will move back to the release position illustrated, and thus reconnect the two sections of the control pipe.

As will be observed, both the emergency pipe 78 and the control pipe 56 lead to the brake valve device 14. This brake valve device may be of any of the conventional types now employed, that illustrated being the type embodying a self-lapping valve mechanism for controlling the supply of fluid under pressure to and its release from the control pipe, and also embodying a rotary valve for controlling the supply of fluid under pressure to and its release from the emergency pipe. Both valve mechanisms are operated by a single handle 90.

When the handle is in a release position, the self-lapping valve mechanism maintains the control pipe 56 in communication with an exhaust port, and at the same time the rotary valve within the brake valve maintains communication between the emergency pipe 78 and a feed valve pipe 91, which connects to a feed valve device 92 of conventional design, in turn directly connected to the main reservoir 16, as shown. Thus in release position of the handle 90 the emergency pipe 78 is maintained charged to feed valve pressure.

When the handle 90 is moved to any position within a service application zone, the communication between the feed valve device and the emergency pipe 78 is maintained, and at the same time fluid under pressure is supplied from the main reservoir to the control pipe to a degree dependent upon the extent of movement of the handle 90 into the service application zone.

When the handle 90 is moved to an emergency position, fluid under pressure is supplied to the control pipe 56 to the maximum degree provided for by operation of the self-lapping valve mechanism, and at the same time the rotary valve within the brake valve disconnects the emergency pipe 78 from the feed valve device 92, and vents the emergency pipe to the atmosphere at an emergency rate.

When the handle is returned to the release position the emergency pipe 78 is recharged through the communication previously described, and at the same time the control pipe is vented to the atmosphere, so that a full release of the brakes will result.

Considering now the manually operated switch device 15, which has been shown in diagrammatic form only, this device essentially includes two stationary contacts 95 adapted to be engaged by a movable contact 96 attached to and movable with a knob 97. The movable contact 96 is normally out of engagement with the stationary contacts 95, and is maintained there by any of the usually employed means, as for example a spring. It engages the stationary contacts 95 only when pressure is manually applied to the knob 97, as by the hand or foot of an operator.

When the contact 96 engages the contacts 95, a circuit is established between a source of electric current, as for example a battery 98, and the electromagnet 23 in the speed controlled valve mechanism 11, by way of conductor 99, the return connection to the battery being established by ground connection 100 of the electromagnet, and ground connection 101 of the battery.

The operation of this embodiment of our invention is as follows:

*Operation*

In describing the operation it will be assumed that the vehicle on which the brake system embodying the invention has been installed is traveling at some relatively high speed. Under this condition the weights 31 in the centrifuge device 27 will be in an outermost position, as illustrated, and as a result the valve 25 will be held in a seated position and the valve 24 in an unseated position.

So long as the vehicle is traveling at a substantially constant rate of speed the parts of the retardation controller device 12 will be in the positions illustrated. Further, with the brake valve handle 90 in release the emergency pipe 78 will be charged and the control pipe 56 will be connected to atmosphere, as described, so that the brakes will be fully released.

When now it is desired to effect a service application of the brakes, the brake valve handle is turned to a position in the service application zone, so that fluid under pressure is supplied to the control pipe. Fluid under pressure supplied to the control pipe flows through the various sections of this pipe, and the devices interposed therein, to the brake cylinder 10, thus applying the brakes to a degree dependent upon the brake valve handle position. It will be observed that flow to the brake cylinder through the speed controlled valve mechanism 11 may be by either or both of two paths, the one path being by way of the now unseated valve 20 and the other by way of the now unseated valve 24.

With the emergency pipe 78 maintained charged during a service application of the brakes, the lower initial tension will exist on the spring 72. If the service application is initiated to a relatively high degree, then as the vehicle diminishes in speed and the coefficient of friction between the brake shoes and the wheels increases, the rate of retardation may increase to the point where the retardation controller weight 65 shifts the valve 71 to the lap position and thus closes communication between the two sections of the control pipe 56 connected thereto. Under this condition brake cylinder pressure cannot be increased by any manipulation of the brake valve handle 90.

In the event that the rate of retardation increases further, the valve 71 will be shifted to the position where fluid under pressure is released from the right hand section of the control pipe 56, thus diminishing brake cylinder pressure until the rate of retardation decreases sufficiently for the valve 71 to be shifted back to the lap position. It will at once be apparent that the retardation controller device will function to maintain a substantially constant rate of retardation, as determined by the initial tension on the spring 72.

For usual service stops it will be permissible for the retardation controller device to maintain the rate of retardation determined by the service adjustment of spring 72 until the vehicle has been brought to rest. After the vehicle has been brought to rest the valve 71 of the retardation controller device will assume the illustrated position, so that the operator may release the brakes by movement of the brake valve handle to release position, or graduate the brakes off as desired.

In the event that the operator desires to make a release while the retardation controller valve 71 is in the lap position, he may do so by virtue of the presence of the one-way check valve device 102. As indicated by the arrow on this device, fluid under pressure may be released from the brake cylinder through it, but cannot be supplied therethrough to the brake cylinder.

When it is desired to effect an emergency application of the brakes, the brake valve handle 90 is turned to the emergency position, thereby venting the emergency pipe 78 at an emergency rate and at the same time supplying fluid under pressure to the control pipe 56 to a maximum degree. Upon venting of the emergency pipe 78 the emergency piston 81 in the emergency valve device 13 moves to its extreme left hand position, opening communication between the right hand section of the control pipe 56 connected thereto and the emergency reservoir 17. Fluid under pressure is thus supplied to the control pipe from the emergency reservoir, and the ultimate or equalization pressure of this supply is intended to be greater than that which may be supplied by the self-lapping valve mechanism in the brake valve device 14. Brake cylinder pressure will, therefore, be much higher than during a service application of the brakes.

When fluid under pressure is vented from the emergency pipe 78 the adjusting mechanism of the retardation controller device increases the tension of the spring 72, as previously described, so that the retardation controller device is now conditioned to permit a higher rate of retardation. With this exception, the retardation controller device functions as before described for a service application of the brakes.

The higher rate of retardation now permissible would, as before referred to at the beginning of the specification, produce discomfort or undesirable shocks near the end of the deceleration period if maintained until the vehicle has been brought to rest. In order to make a smooth stop, the operator will depress the knob 97 of the switch device 15, and thus energize the electromagnet 23 in the speed controlled valve mechanism 11. The electromagnet will then shift valve 20 to its seated position and valve 21 to its unseated position. Chamber 38 is thus connected to the brake cylinder 10 and the diaphragm 37 is subjected on its uppermost side to fluid at brake cylinder pressure.

Now the parts of the centrifuge device are preferably so designed that the valve 25 will be held seated and the valve 24 unseated until a predetermined low vehicle speed has been reached. Before this speed has been reached the shifting of the valve 21 to unseated position will lower the left hand end of the valve operating member 47, but this member will not quite engage the stem of the release valve 52. To unseat the release valve 52 will require further the unseating of the valve 25, whereupon the member 47 will engage the stem of the release valve and hold it unseated.

Assuming now that the vehicle reaches the aforesaid predetermined low speed, the weights 31 in the centrifuge device will have moved inwardly far enough for the spring 26 to shift the valves 25 and 24 to unseated and seated positions, respectively. The brake cylinder 10 will then be disconnected from the control pipe 56, except for the restricted communication provided for by choke 61. As the valve 25 unseats, the member 47 engages the stem of valve 52 and unseats this valve. Fluid under pressure may then be released from the brake cylinder to the atmosphere, either by way of the now unseated valve 25 or by way of the unseated valve 21, and of course past the unseated release valve 52.

If too abrupt a release of fluid under pressure from the brake cylinder should be produced, a noticeable and objectionable diminution in the rate of retardation of the vehicle will result. In order to avoid this the choke 61 is provided. This choke permits fluid to be supplied from the control pipe 56 to the brake cylinder at a rate just sufficient to prevent a too harsh release of the brakes. Thus with the parts properly proportioned the rate of retardation will be tapered off quite smoothly at the end of the deceleration period, and the vehicle will be brought to rest without severe shock or discomfort to the passengers.

It should be observed, however, that if in special instances a rapid release by the speed controlled valve mechanism is desired, it can be obtained by merely turning the brake valve handle 90 to release position and thus terminating all supply through the choke 61.

As the vehicle comes to rest the operator can, of course, release pressure manually applied to the switch knob 97, and thereby deenergize the electromagnet 23. The valves 20 and 21 will be then shifted to their upper position, as illustrated, and as a result the valve operating member 47 will be actuated upwardly far enough for the release valve 52 to be seated. With the release valve thus seated, brake cylinder pressure may be controlled by manipulation of the brake valve handle 90 as desired.

It will be observed that with the diaphragm 37 subject to brake cylinder pressure, and with brake cylinder pressure varying over quite a wide range, the speed at which the centrifuge device 27 becomes effective in diminishing brake cylinder pressure, after the switch 15 has closed its contacts, may vary. For example, if the brake cylinder pressure is 60 pounds (per sq. in.) at the time the switch 15 is operated the centrifuge device may open the release valve 52 at one speed. If the brake cylinder pressure should happen to be 50 pounds at this instant, then a lower pressure will be acting on diaphragm 37, and the release valve 52 will be unseated at a lower speed.

By proper design of the centrifuge device this difference in speeds, for the different brake cylinder pressures met with in practice, may be made quite small and well within tolerable limits. Further, since it requires a greater length of time to release high pressures from the brake cylinder than to release low pressures, it will at once be appreciated that satisfactory smoothness and tapering off of the rate of retardation at the end of the deceleration period will be obtained for all brake cylinder pressures.

When it is desired to release the brake following an emergency application, the brake valve handle 90 is returned to the release position; following which the emergency pipe 78 is recharged and the parts of the emergency valve device 13 move to the release position illustrated. The release from the brake cylinder is then accomplished through the brake valve device in the usual manner. At the same time, the service adjustment of the retardation controller device is restored.

While the invention has been described with reference to one embodiment thereof, it is not our intention to be limited to the precise details of this embodiment, or otherwise than according to the spirit and scope of the appended claims.

Having now described our invention, what we claim as new and desire to secure by Letters Patent, is:

1. In a vehicle brake system, in combination, a communication through which fluid under pressure is supplied to effect an application of the brakes, a retardation controller device for controlling said communication, speed controlled means for also and independently controlling said communication, and means for selectively controlling the effectiveness and ineffectiveness of said speed controlled means.

2. In a vehicle brake system, in combination, a communication through which fluid under pressure is supplied to effect an application of the brakes, an inertia device for controlling said communication, means operated according to the speed of the vehicle for also and independently controlling said communication, and selective means for rendering said speed controlled means effective only at the will of the operator.

3. In a vehicle brake system, in combination, a brake cylinder, a communication through which fluid under pressure is supplied to effect a supply of fluid under pressure to said brake cylinder and from which fluid under pressure is released to effect a release of fluid under pressure from the brake cylinder, a retardation controller device, speed controlled means, means so constructed and arranged that said retardation controller device and said speed controlled means operate independently to control said communication, and means for selecting one of said two means only at the will of the operator.

4. In a vehicle brake system, in combination, a brake cylinder, a communication through which fluid under pressure is supplied to effect a supply of fluid under pressure to the brake cylinder, automatic and straight air means for effecting a supply of fluid under pressure to said communication, a retardation controller device for controlling said communication, speed controlled means for also and independently controlling said communication, and means manually controlled by the operator for selecting said speed controlled means only at desired times.

5. In a vehicle brake system, in combination, a brake cylinder, a communication through which fluid under pressure is supplied to and released from said brake cylinder, an adjustable type retardation controller device for controlling the pressure of fluid in said communication, said retardation controller device permitting a higher pressure in said communication for one adjustment thereof and a lower pressure for a different adjustment thereof, speed controlled means for independently controlling the pressure in said communication, and means manually operable by the operator for determining when the speed controlled means is to be effective.

6. In a vehicle brake system, in combination, a brake cylinder, a valve mechanism shiftable from one position to another to open a communication through which fluid under pressure is adapted to be released from the brake cylinder, a centrifuge device operable at a predetermined vehicle speed to shift said valve mechanism as aforesaid, electroresponsive means adapted only when energized to permit an effective release of fluid under pressure from said brake cylinder, and manually operable means for controlling the energization of said electroresponsive device.

7. In a vehicle brake system, in combination, a brake cylinder, means for effecting a supply of fluid under pressure to said brake cylinder, a release valve device operable to release fluid under pressure from said brake cylinder, a centrifuge device operated according to the speed of the vehicle, a magnet valve device, and means so constructed and arranged that said centrifuge device is effective at a predetermined vehicle speed to operate said release valve device only when said magnet valve device is energized.

8. In a vehicle brake system, in combination, a brake cylinder, means for establishing fluid pressures in said brake cylinder to effect an application of the brakes, means operated according to the speed of the vehicle and being selective at will by an operator after initiating an application of the brakes to release fluid under pressure from the brake cylinder at some particular speed, and means providing a restricted communication to the brake cylinder for supplying fluid under pressure thereto at a restricted rate while fluid under pressure is being released therefrom at a greater rate by operation of said last mentioned means.

9. In a vehicle brake system, in combination, a brake cylinder, a release valve device operable to release fluid under pressure from the brake cylinder, a speed controlled device having an element shiftable from a high speed position to a low speed position as the speed of the vehicle diminishes, means associated with said shiftable element for moving therewith as the vehicle speed reduces, and means under control of the operator for causing said last means to effect the operation of said release valve device to release fluid under pressure from the brake cylinder.

ELLIS E. HEWITT.
JOHN N. GOOD.